United States Patent
Marcheschi et al.

(10) Patent No.: US 12,257,572 B2
(45) Date of Patent: Mar. 25, 2025

(54) CATALYTIC SUPPORT FOR CATALYSIS PROCESSES

(71) Applicants: Massimo Marcheschi, Prato (IT); Stefano Carnevale, Prato (IT)

(72) Inventors: Massimo Marcheschi, Prato (IT); Stefano Carnevale, Prato (IT)

( * ) Notice: Subject to any disclaimer, the term of this patent is extended or adjusted under 35 U.S.C. 154(b) by 742 days.

(21) Appl. No.: 17/432,379

(22) PCT Filed: Dec. 12, 2019

(86) PCT No.: PCT/IB2019/060711
§ 371 (c)(1),
(2) Date: Aug. 19, 2021

(87) PCT Pub. No.: WO2020/178630
PCT Pub. Date: Sep. 10, 2020

(65) Prior Publication Data
US 2022/0250045 A1    Aug. 11, 2022

(30) Foreign Application Priority Data
Mar. 1, 2019 (IT) .................... 102019000002975

(51) Int. Cl.
| | |
|---|---|
| *B01J 31/06* | (2006.01) |
| *B01J 35/00* | (2024.01) |
| *B01J 35/04* | (2006.01) |
| *B01J 35/56* | (2024.01) |
| *B33Y 80/00* | (2015.01) |
| *B29C 64/118* | (2017.01) |

(52) U.S. Cl.
CPC ............... *B01J 31/06* (2013.01); *B01J 35/19* (2024.01); *B01J 35/56* (2024.01); *B33Y 80/00* (2014.12); *B29C 64/118* (2017.08)

(58) Field of Classification Search
CPC . B01J 31/06; B01J 35/19; B01J 35/56; B33Y 80/00
See application file for complete search history.

(56) References Cited

U.S. PATENT DOCUMENTS 6,746,651 B1   6/2004 Ponzo et al.

FOREIGN PATENT DOCUMENTS

| EP | 0412931 A1 | 2/1991 | |
|---|---|---|---|
| EP | 1284159 A2 | 2/2003 | |
| JP | H0708138 A * | 4/1995 | ........... F01N 3/2086 |
| JP | H07108138 A | 4/1995 | |
| JP | 2012061393 A * | 3/2012 | |

OTHER PUBLICATIONS

By "List of Transparent Plastic Materials", Omnexus, (Published Oct. 25, 2017).*
International Search Report and Written Opinion dated Jan. 29, 2020 from counterpart International Patent Application No. PCT/IB2019/060711.
Italian Search Report dated Oct. 2, 2019 from counterpart Italian Patent Application No. 2019000002975.

* cited by examiner

*Primary Examiner* — Yong L Chu
(74) *Attorney, Agent, or Firm* — SHUTTLEWORTH & INGERSOLL, PLC; Timothy J. Klima

(57) ABSTRACT

A catalytic support for catalysis processes including a main body, at least one conduit made in said main body, said conduit having an inlet portion made on a first surface of said main body and an outlet portion made on a second surface of said main body, said first surface being opposite said second surface said main body includes a plurality of layers at least partially superposed and mutually adherent, said layers forming a plurality of recesses at the intersections and superposition of said layers, said recesses being configured to house particles of at least one catalyst element.

8 Claims, 3 Drawing Sheets

CATALYTIC SUPPORT FOR CATALYSIS PROCESSES

This application is the National Phase of International Application PCT/IB2019/060711 filed Dec. 12, 2019 which designated the U.S.

This application claims priority to Italian Patent Application No. 102019000002975 filed Mar. 1, 2019, which application is incorporated by reference herein.

TECHNICAL FIELD

This invention relates to a catalytic support for catalysis processes.

The expression "catalytic support" means an element comprising at least an inlet and an outlet designed for the passing through of a fluid inside it.

The expression "catalysis processes" means all those processes carried out in various industrial applications, such as, for example, the treatment of gas, the purification of air or water, or the treatment of gaseous fluids or liquids in general.

BACKGROUND ART

The catalytic supports designed for the above-mentioned industrial processes are currently made of ceramic materials, such as, for example, mullite or cordierite.

The known ceramic supports are generally made by means of extrusion operations.

The ceramic material is in itself, and also following extrusion operations, suitable for use in catalysis processes since, on the one hand, it has an adequate porosity to house the particles (or nanoparticles) of the catalyst agent and, on the other hand, it is a material which is not active during the catalysis processes process itself.

It is in fat known that, in a catalysis process the active element in the particular process is the catalysts which allows and/or favours the reaction between the various reagents for generating the consequent products.

Merely by way of example, prior art catalysts comprise titanium dioxide, gold, platinum, palladium etc. . . .

In short, the supports, like also those according to the invention, only perform the function of keeping in a predetermined position a quantity of specific catalyst element of the process in progress, favouring contact with the fluid which contains the products.

However, the known ceramic supports are not free of significant drawbacks.

A first major drawback is due to the fact that the ceramic material with which they are made has a high density which translates into a considerable specific weight of the finished support.

A further significant drawback is that the ceramic material is very fragile by its very nature and, therefore, the risk of failure is very high if subjected to impacts. It is to be understood that a broken ceramic support can no longer be used.

Consequently, not only during the industrial catalysis process in which the ceramic support is used, but also during all the steps from the production of the ceramic support to its transport and storage, a very high level of care and attention is required.

A further major drawback is due to the fact that the method with which the ceramic supports are made, as mentioned above, by extrusion, is characterised by major production limitations.

In particular, the extrusion process does not give any geometrical freedom in the making of the support.

Even more specifically, it is not possible to make a ceramic support by extrusion which has conduits for the passage of the fluid being processed which are not perfectly straight and parallel to the main direction of extrusion.

If the catalysis process comprises a photocatalysis, that is to say, a catalysis which uses a catalyst which can be activated if it is subjected to a luminous source (both in the visible and UV fields), i ceramic supports have a further major limitation in terms of performance caused by the impossibility to make them transparent or translucent.

It is in fact known that the output of the photocatalysis processes is greater the more the light is able to irradiate the catalyst positioned on the catalytic support.

It is clear that as it is not transparent or at least translucent it is very difficult for the light to enter in an optimum manner in all the inner portions of the catalytic support, that is to say, in those portions where there is a large amount of catalyst agent, which remains unused in a maximised fashion.

AIM OF THE INVENTION

The aim of the invention is to provide a catalytic support for catalysis processes which is capable of overcoming the drawbacks of the prior art.

In particular, the aim of the invention is to provide a catalytic support for catalysis processes which has a specific weight much less than ceramic material, that is to say, a catalytic support lighter than use of the prior art.

Another aim of the invention is to provide a catalytic support for catalysis processes which is much more resistant to impact compared with known ceramic supports.

Another aim of the invention is to provide a catalytic support for catalysis processes which does not have production constraints which the limit freedom of geometries which can be formed with the catalytic support.

Another aim of the invention is to provide a catalytic support for catalysis processes made of transparent or at least translucent or opaque material.

The above aims are achieved by a catalytic support for catalysis processes comprising the technical features described in one or more of the accompanying claims.

BRIEF DESCRIPTION OF THE DRAWINGS

Further features and advantages of the invention are more apparent in the detailed description below, with reference to a preferred, non-limiting, embodiment of a catalytic support for catalysis processes as illustrated in the accompanying drawings, in which.

DETAILED DESCRIPTION OF PREFERRED EMBODIMENTS OF THE INVENTION

Figure 1:
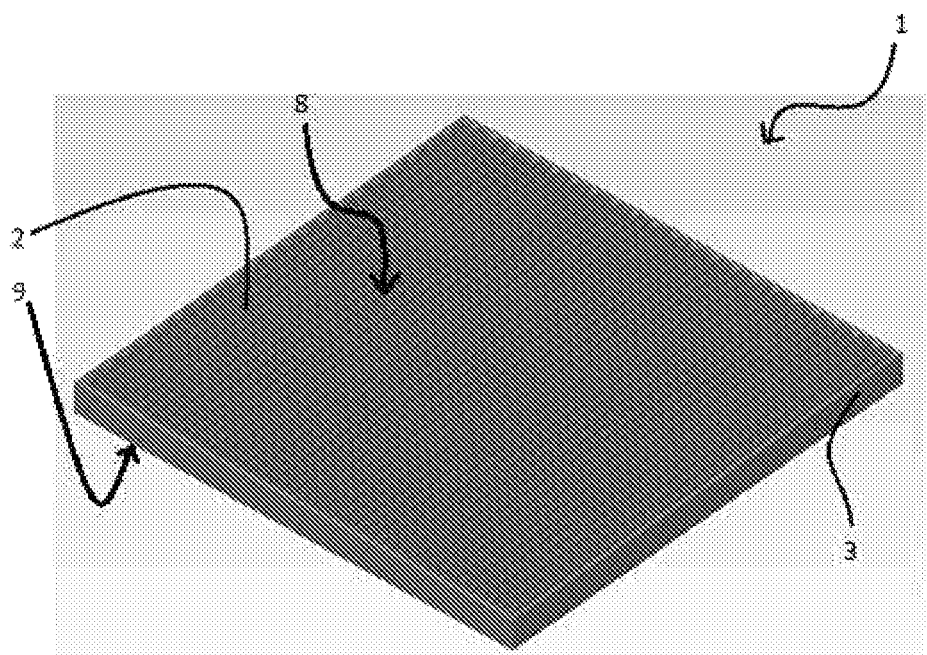
FIG. 1 is a perspective view of a catalytic support for catalysis processes according to the invention.

With reference to the accompanying drawings, the numeral 1 denotes in its a catalytic support for catalysis processes.

The catalytic support 1 for catalysis processes according to the invention comprises in its basic embodiment a main body 3 with at least one conduit 2 made inside it.

Each conduit 2 has an inlet portion 6 made on a first surface 8 of the main body 3, for example the upper one, and an outlet portion 7 made on a second surface 9 of the main body 3, for example the lower one.

In short, each conduit 2 passes completely through the entire thickness of the main body 3, that is, the first surface 8 is opposite the second surface 9 with respect to a direction of flow of a fluid through the main body 3.

The main body 3 comprises a plurality of layers 4 at least partially superposed with each other and at the same time mutually adherent in such a way as to form a consistent main body.

The main body 3 is a single body which is made from the superpositioning of the plurality of layers 4.

Between one layer 4 and the next 4, and more generically close to every intersection and superposition of the layers 4, a plurality of recesses 5 is created, configured to house particles of at least one catalyst element.

The positioning of the catalyst element inside the recesses 5 can be performed by any of the known technologies, such as, for example, by immersion or spraying of the catalyst element on the catalytic support 1.

Advantageously, the main body 3 is made of plastic material.

In particular, the main body 3 can be made of ABS (Acrylonitrile Butadiene Styrene) and its derivatives, ASA (Acrylonitrile Styrene Acrylate) and its derivatives, PETG (Polyethylene Terephthalate) and its derivatives, Nylon and its derivatives, PLA (Polylactic Acid) and its derivatives.

Moreover, advantageously, since currently the best technology for production of a catalytic support 1 according to the invention is three-dimensional printing FDM (fused deposition modelling) or FFM (fused filament manufacturing) the main body 3 can be made with any material with the above-mentioned technologies.

Advantageously, especially in the case in which the catalysis process wherein the catalytic support 1 according to the invention is used is a photocatalysis process then the main body 3 can be made from a transparent or translucent material. In this way, the entire output of the photocatalysis process is optimised. In fact, the light, which acts as activator of the catalyst located in the recesses 5 of the main body 3 will not have opaque obstacles and will be able to pass through the entire main body 3, thereby increasing the overall output of the catalytic support 1.

Advantageously, the main body 3 comprises a honeycomb structure, that is to say, with the conduits 2 arranged alongside each other for a significant portion or for the entire surfaces 8, 9 of the main body 3.

Advantageously, the conduits can also be made with horizontal sections with respect to the inlet 8 and outlet 9 directions, lengthening the path of the fluid inside them and increasing the contact with the walls and with the catalyst.

FIG. 1 shows in its entirety a possible embodiment of a catalytic support 1 according to the invention.

The main body 3 can preferably comprise a perimeter stiffening strip which is configured to facilitate any installation inside the machinery which performs the above-mentioned catalytic processes.

Figure 2:
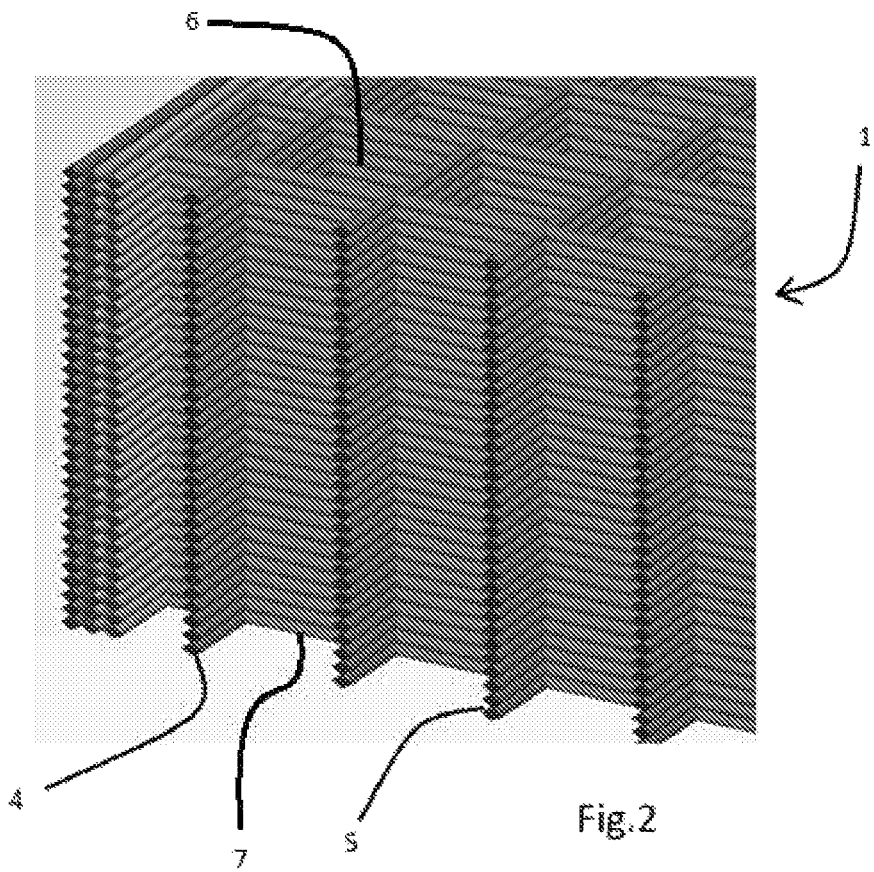
FIG. 2 is a cross-section perspective view of a catalytic support for catalysis processes.

FIG. 2 clearly shows how the superposed layers 4 create recesses 5, that is to say, seats where the catalyst particles are housed.

It is possible to adjust and determine the overall porosity of the catalytic support 1 as a function of the number of layers 4 which make up the main body 3 and their diameter.

By determining the overall porosity of the catalytic support 1 it is also possible to determine beforehand the quantity of catalyst which the support 1 will be able to retain on its surfaces.

Figure 4:
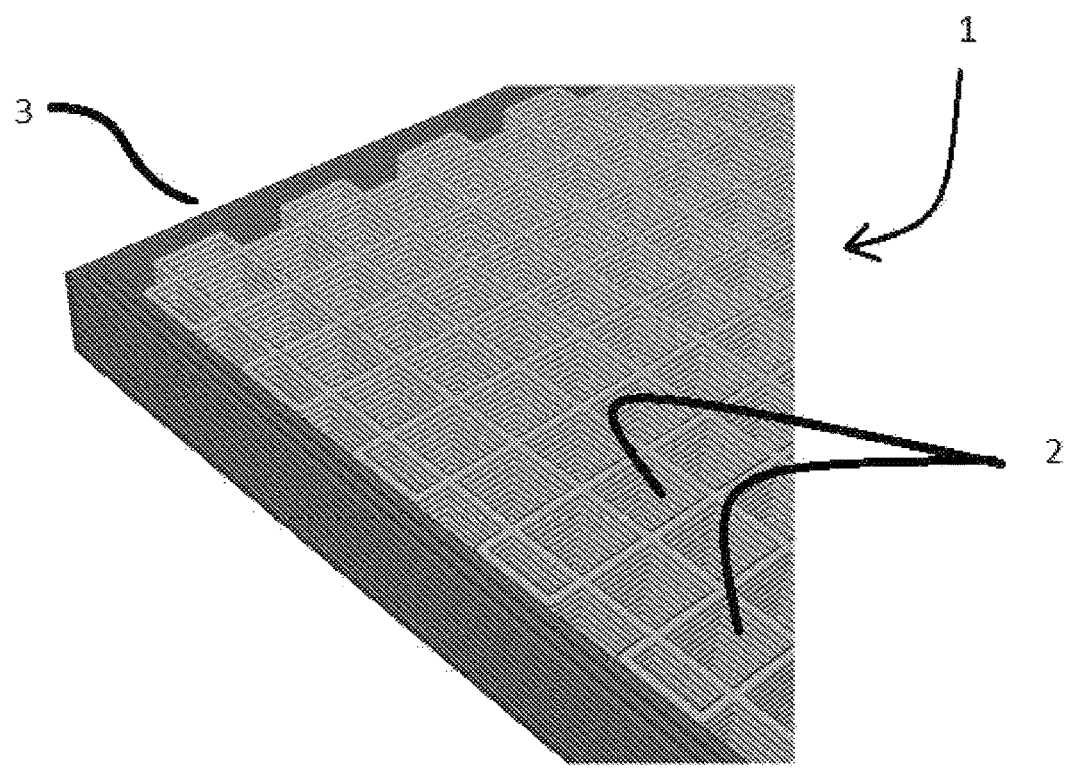
FIG. 4 is a partial perspective view of a second embodiment of a catalytic support for catalysis processes and FIG. 5 is a partial exploded view of a third embodiment of a catalytic support for catalysis processes.

According to the embodiment shown in FIGS. 2 and 4, the conduits 2 have an extension substantially parallel to the extension in thickness of the main body 3.

Figure 3:
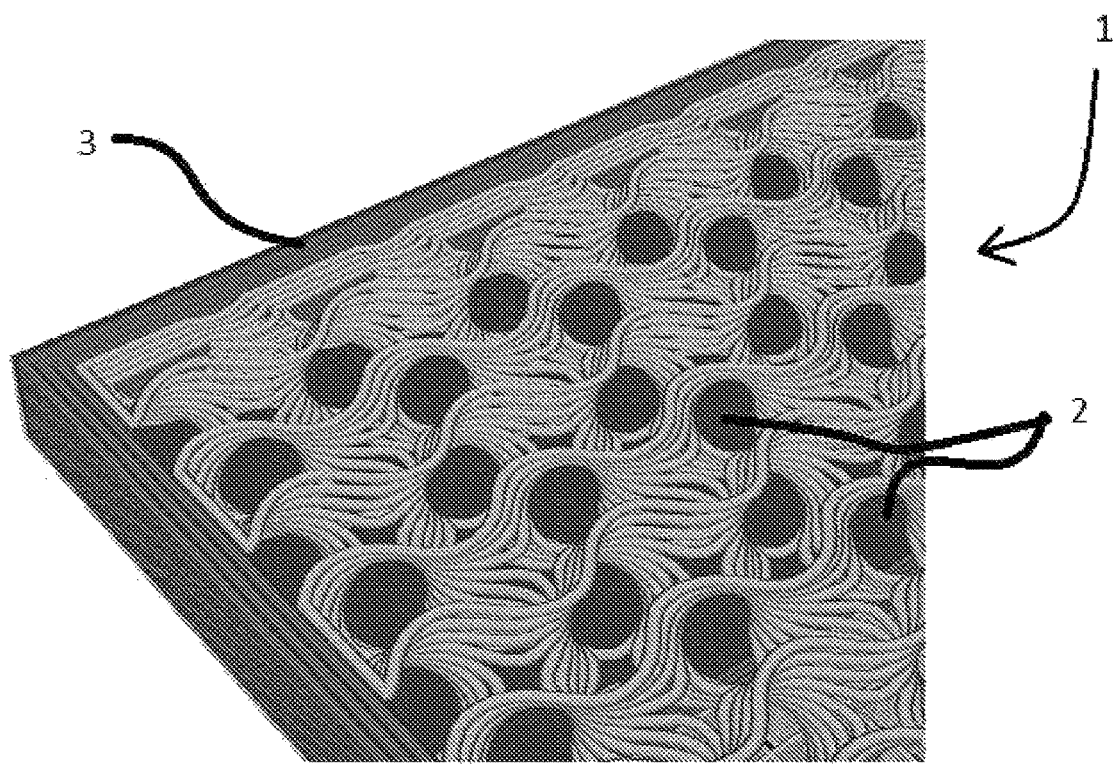
FIG. 3 is a partial perspective view of a first embodiment of a catalytic support for catalysis processes.

According to the embodiment shown in FIG. 3, the conduits 2 have, on the other hand, an extension which is not parallel, preferably not rectilinear, to the longitudinal of the main body 3.

For certain catalysis processes, this solution can have a better performance since the fluid which is obliged to pass inside the conduits 2, finding a minimum resistance due to the geometry of the conduits, impacts significantly and for a longer time with the catalyst, considerably increasing the catalysis reaction.

Figure 5:
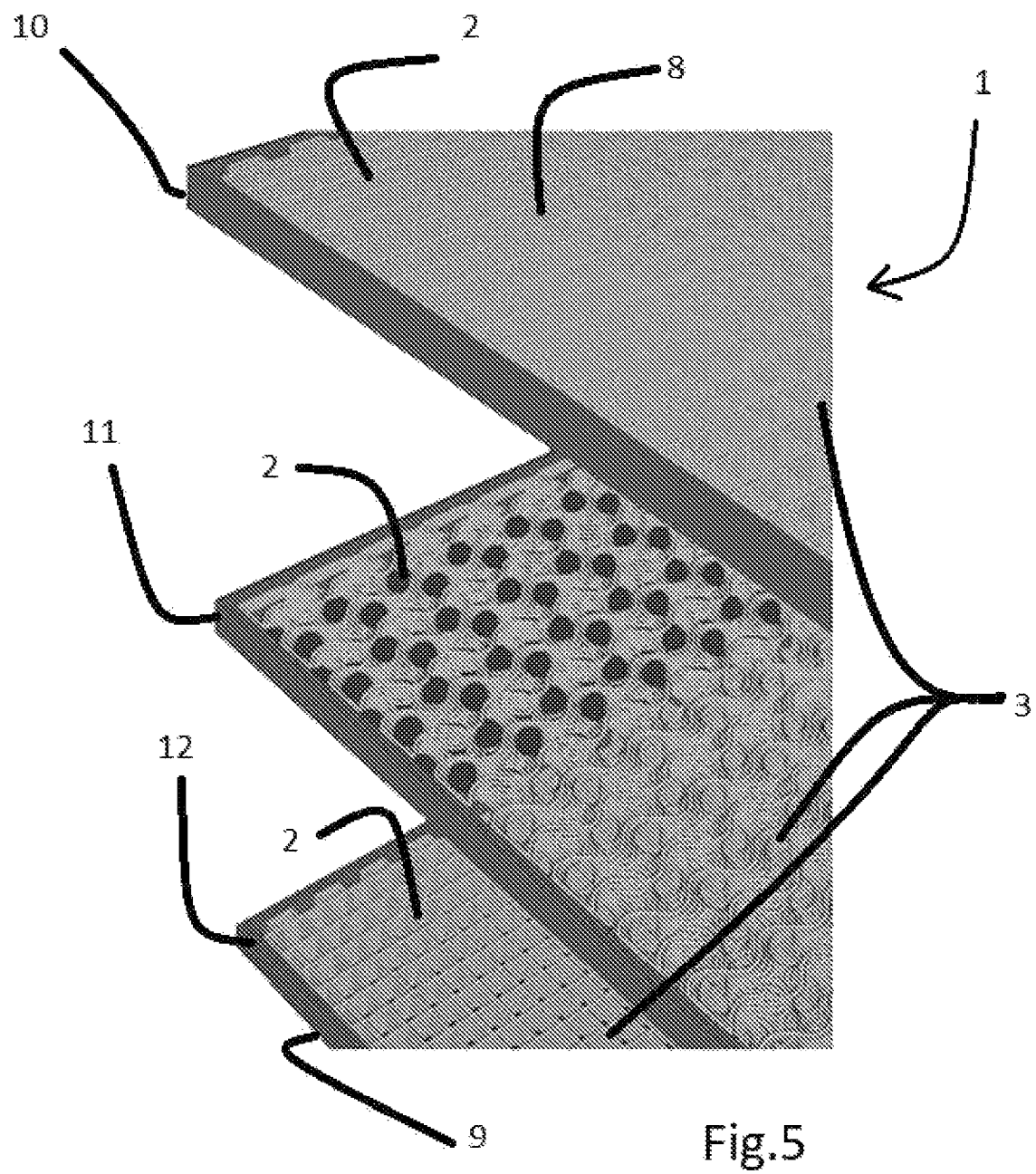

FIG. 5 shows a further embodiment of a catalytic support 1 according to the invention wherein the main body 3 comprises a plurality di superposed portions 10, 11, 12 each of which comprises in turn a respective plurality of conduits 2.

The conduits 2 of each of the portions 10, 11 and 12 have a geometrical extension different from each other (the drawing shows, for example, the portion 10 has the conduits 2 with a parallel extension, the portion 11 with a non-parallel extension and the portion 12 again with a parallel extension).

The conduits in their entirety, that is, the initial part of the conduit of portion 10, the intermediate part of portion 11 and the final part of portion 12 are in mutual fluid communication between the first surface 8 and the second surface 9 of the main body 3, generating geometrical partitions such as to significantly increase the quantity of fluid which enters into contact with the catalyst and the relative contact time, significantly improving the efficiency of the catalysis reaction.

The catalytic support 1 according to the invention, in particular if printed by means of a FDM or FFM printer is free of every geometrical constraint, and consequently the conduits can have any geometrical shape extending inside the main body 3.

The invention brings important advantages, overcoming the limitations and drawbacks of the prior art.

A first major advantage consists in the fact that a catalytic support 1 made according to the invention, in particular if made of plastic material, has, with the same volume, a much reduced weight with respect to the corresponding ceramic catalytic support of the prior art.

A second major advantage consists in the fact that a catalytic support 1 made according to the invention, in particular if made of plastic material, is much more resistant to impacts than the corresponding ceramic catalytic support of the prior art.

A further significant advantage consists in the fact that in the production process, advantageously by means of a three-dimensional FDM or FFM printer, there is a complete freedom of choice of the geometry of the support 1, which is the complete opposite to the constrained geometry due to the extruded ceramic supports of the prior art, allowing geometries to be developed which are able to significantly increase the quantity of fluid and therefore reagents which enter into contact with the catalyst and the relative contact time and therefore significantly increase the efficiency of the catalysis reaction.

Lastly, if it is to be used in photocatalysis processes, the support 1 according to the invention can be made from transparent or at least opaque material, which is a characteristic which translates into an optimisation of the performance of the process.

The invention claimed is:

1. A catalytic support for catalysis processes comprising:
a main body made of a plastic material,
a plurality of conduits made in said main body, said conduits each having an inlet portion made on a first surface of said main body and an outlet portion made on a second surface of said main body, said first surface being opposite said second surface,
said main body comprising:
  a plurality of layers at least partially superposed and mutually adherent to form said main body, said layers of said main body forming a plurality of recesses at intersections and superposition of said layers, said recesses being configured to house particles of at least one catalyst element, and
  a honeycomb structure or a reticular structure with cells of any shape, with said conduits arranged alongside each other for a significant portion or for an entire surface of the main body.

2. The catalytic support according to claim 1, wherein said main body is made of ABS (Acrylonitrile Butadiene Styrene) and its derivatives.

3. The catalytic support according to claim 1, wherein said main body is made of ASA (Acrylonitrile Styrene Acrylate) and its derivatives.

4. The catalytic support according to claim 1, wherein said main body is made of PETG (Polyethylene Terephthalate) and its derivatives.

5. The catalytic support according to claim 1, wherein said main body is made of Nylon or PLA (Polylactic Acid) and its derivatives.

6. The catalytic support according to claim 1, wherein said main body is made of transparent or translucent material.

7. The catalytic support according to claim 1, wherein said conduits each have an extension not parallel to the longitudinal extension of said main body.

8. The catalytic support according to claim 1, wherein said main body comprises a plurality of superposed portions each of which comprises a respective plurality of the conduits having a geometrical extension different to each other but in mutual fluid communication between said first surface and said second surface of said main body.

* * * * *